Jan. 3, 1956    M. J. G. TIPPER    2,729,263
MACHINE FOR FASTENING SAUSAGE CASINGS
Filed Nov. 16, 1954    3 Sheets-Sheet 1
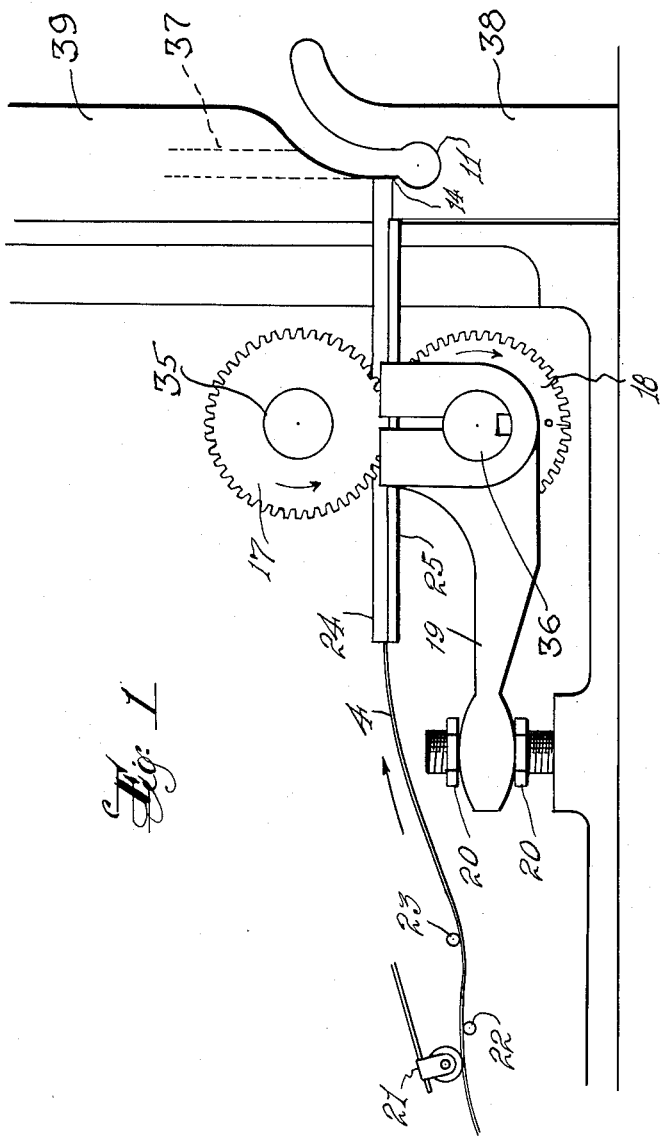

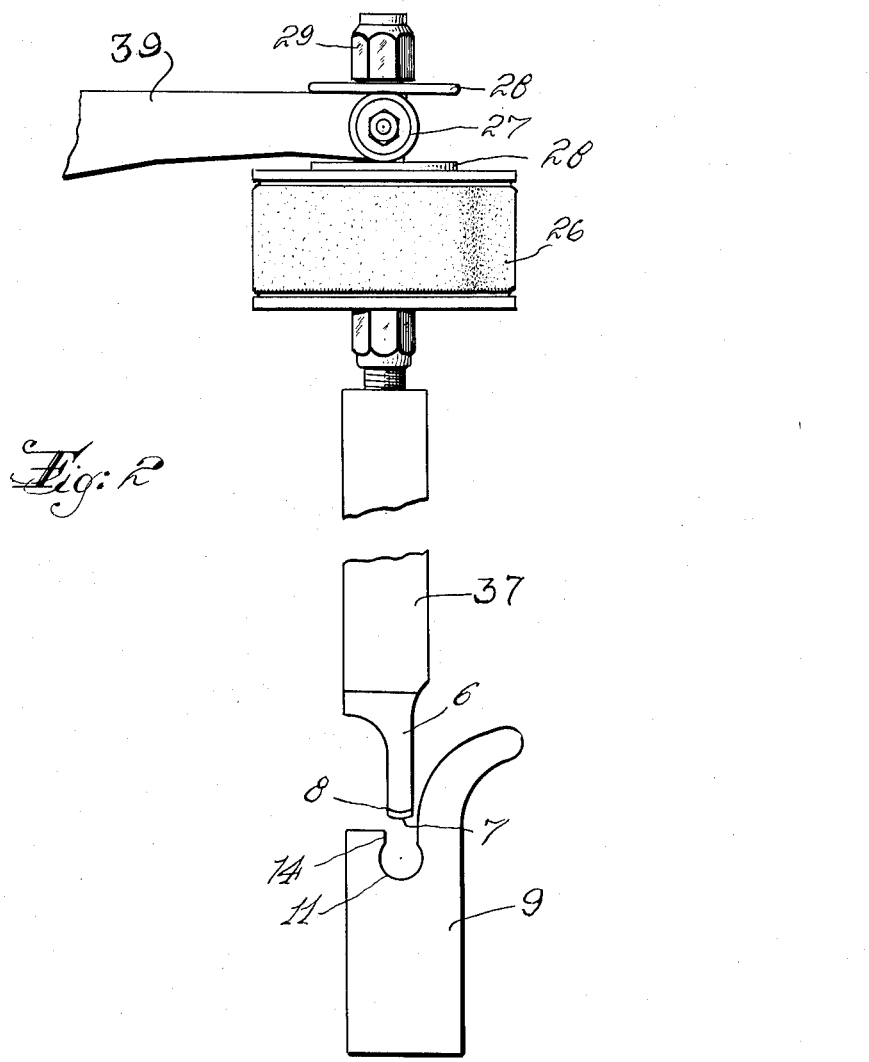

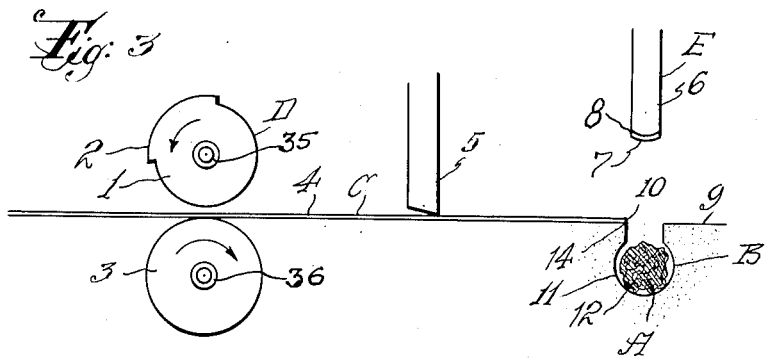
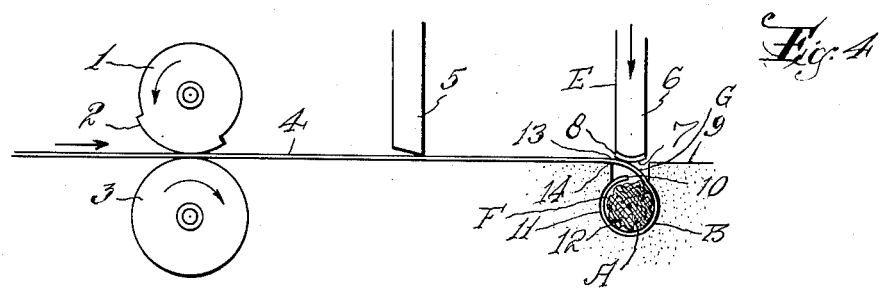
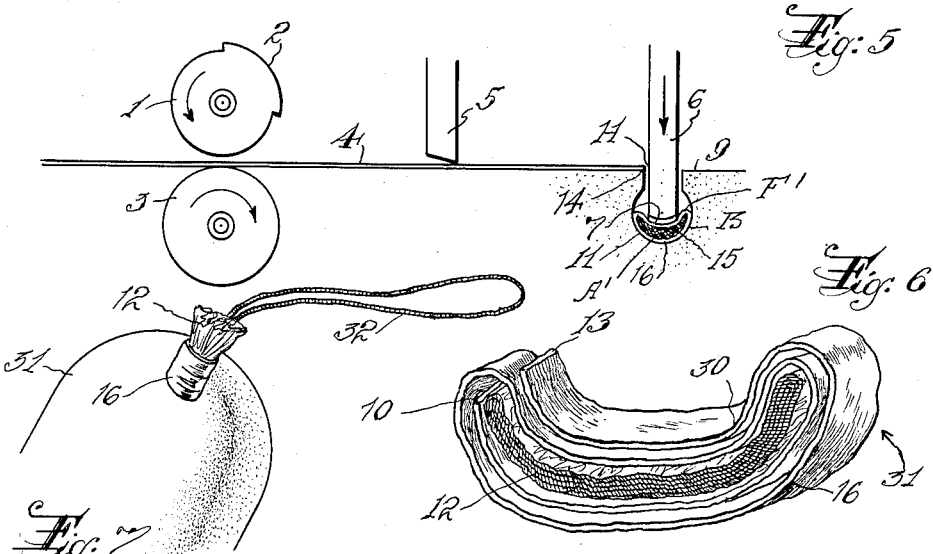

United States Patent Office 2,729,263
Patented Jan. 3, 1956

2,729,263
MACHINE FOR FASTENING SAUSAGE CASINGS

Maynard J. G. Tipper, Oakland, Calif.

Application November 16, 1954, Serial No. 469,145

1 Claim. (Cl. 153—1)

This invention relates to the fastening of sausage casings, particularly of small casings ranging in widths of 1⅝" to 3", which generally go into the production of sausages known as chubs and midgets.

The invention relates to a machine and process for feeding aluminum strip, surrounding the casing end therewith, cutting the strip to the desired length, and indenting the surrounded casing end to form a positive, sanitary, non-slippable seal.

In the past, small sausage casings of the type dealt with herein have been tied with string by hand. The present process and apparatus applies an aluminum fastener and an accompanying string loop in less than five seconds, and is 350% faster than hand tying. It is simple in operation, involving only the insertion of the casing (and string, if desired) into the machine by hand. Thereafter the machine carries out the fastening step in one operation.

The invention will be more readily understood by reference to the acompanying drawings in which a preferred embodiment is described. Figure 1 shows a schematic side view of the essential parts of the machine, while Figure 2 depicts a similar view of the punch and die thereof. Figures 3, 4 and 5 are schematic side views of the more important operational steps in the fastening procedure involved. An enlarged end view of the fastened end of a casing is illustrated in Figure 6, while Figure 7 presents a sausage end fastened with the machine of the present invention. Similar numerals refer to similar parts in the various figures.

Referring again to the drawings, numeral 4 is a thin narrow strip of aluminum or other suitable material used for the fastener, which is fed from a reel of the material (not shown) and passed under guide roller 21 and between guides 22 and 23 and thence to guiding platform 24—25 which leads to the two vertically disposed, oppositely rotating rollers 1 and 3 driven by driving gears 17 and 18 which, in turn, are driven by an electrical motor or other suitable means (not shown). Upper roll 1 has a protruding circumferential portion 2 which makes contact with strip 4 during a fraction of the revolution of roll 1. This portion 2 serves as the intermittent feeding means for feeding strip 4 into die cavity 11. Numeral 5 is employed to generally denote the guide means for the strip.

Feed control lever 19 terminates with an end which is positioned vertically by adjusting nuts 20, thereby enabling adjustment of the pressure or grip of feed rolls 1 and 3 which are mounted on shafts 35 and 36, respectively (opposite gears 17 and 18, respectively).

Punch body 37 is disposed to ride in guide 39 superimposed over die body 9, and is reciprocated vertically via rocker arm 39 and roller 27 which are actuated by a cam (not shown) driven by the motor. The vertical motion of rocker arm 39 is transmitted via plates 28 to punch body 37 which is connected with rubber bumper 26 serving as a shock absorber and resilient pressure transmitting means for the punch. Nut 29 serves to adjust the "set" position of the punch where it stops while the tape is being fed out.

Punch 6 reciprocates vertically and moves in and out of die cavity 11 (or B) in which are disposed casing end 12 and fastener strip 16 (or G). Punch 6 also is provided with a sharp cutting edge 8, as is inner edge 14 of the die.

When in operation, a timing sequence is maintained as follows:

The punch 6 comes down and stops at the "set" position as shown in Figure 4. After the punch has stopped, edge 2 of roll 1 begins to feed out strip 4. When edge 10 of strip 4 (or C), reaches curved bottom 7 of punch 6 (or E), the strip is deflected into cylindrical cavity 11 of the die and encircling the casing 12 (or A) about 1¾ times. When this occurs, the edge 2 of roll 1 has left strip 4, leaving the strip stationary.

At this point, punch 6 continues its downward stroke, sharp edge 8 cutting off strip 4 against sharp cavity edge 14, and finally protruding end 7 of the punch indents or crimps the strip-encircled casing 16 when the punch reaches the end of its stroke (Fig. 5). The punch movement is effected by rocker arm 39 actuated by a cam (not shown) having an interrupted rise which drives the punch. When crimped, the fastened casing 16 assumes a U-shape (A') as in Figure 5. It will be noted from the enlarged view in Figure 6 that the strip makes about 1¾ turns within the die before it is cut.

It is preferred that the extreme downward pressure point 7 of punch 6 be disposed slightly off-center and away from edge 13 of the strip, the pressure point being concentrated as at 30 in Figure 6. If a string hanger is desired for the sausage, the string loop may be inserted in the die with the casing prior to the fastening operation, in which case the strip will encompass the string and the latter will be incorporated tightly in the fastened assembly, as depicted in Figure 7 showing fastened sausage casing 31.

After the fastening is completed, punch 6 is raised, the casing is removed, another casing is inserted, and the operation is repeated. As is apparent from the foregoing, all of the operations can be conducted by use of one motor through the use of shafts, cams, and the like, as is well understood in the art. The operations can be performed in a compact, portable machine at a rate of 1,000 casings per hour. The metal closure bands are automatically made from strip by being applied around the casing and cut to correct length, as already outlined. It is also possible to mount a counter to record each stroke of the punch, if desired.

I claim:

In a casing fastening machine used for sealing the ends of casings with a strip, the improvement comprising intermittent feeding means for feeding a continuous strip into a die cavity, a die defining a die cavity in which the casing is inserted, said die having a sharp cutting edge adjacent the strip feeder, a vertically reciprocating punch having a sharp cutting edge in register with the sharp die edge, a projecting tip on said punch serving as crimping means, said feeding means being adapted to feed a predetermined length of strip prior to an idle period, said cutting edges being adapted to cut the strip at the end of the feeding period, and said punch being adapted to deflect and guide said strip during the feeding stroke and around said casing in said cavity and then to squeeze and crimp said encircled casing.

References Cited in the file of this patent

UNITED STATES PATENTS

| | | |
|---|---|---|
| 1,381,679 | Verran et al. | June 14, 1921 |
| 1,493,075 | Hirschhorn | May 6, 1924 |
| 2,099,624 | Robarge | Nov. 16, 1937 |
| 2,245,407 | Lignian | June 10, 1941 |
| 2,670,294 | Frank | Feb. 23, 1954 |

FOREIGN PATENTS

| | | |
|---|---|---|
| 810,953 | Germany | Aug. 16, 1951 |
| 171,576 | Austria | June 10, 1952 |